United States Patent
Gupta et al.

(10) Patent No.: US 9,477,956 B2
(45) Date of Patent: Oct. 25, 2016

(54) METHOD TO ENABLE CONSUMERS TO MAKE PURCHASES AT E-COMMERCE WEBSITES USING THEIR MOBILE NUMBER

(71) Applicant: MasterCard International Incorporated, Purchase, NY (US)

(72) Inventors: Akshat Gupta, Vernon, CT (US); Ricardo Pareja, São Paulo (BR)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 14/573,116

(22) Filed: Dec. 17, 2014

(65) Prior Publication Data
US 2016/0180321 A1     Jun. 23, 2016

(51) Int. Cl.
    *G06F 17/30*     (2006.01)
    *G06Q 20/32*     (2012.01)
    *G06Q 20/40*     (2012.01)

(52) U.S. Cl.
    CPC ........ *G06Q 20/3226* (2013.01); *G06Q 20/325* (2013.01); *G06Q 20/4012* (2013.01)

(58) Field of Classification Search
    CPC .................................................. G06Q 20/425
    USPC ................ 235/380; 705/39, 43, 44
    See application file for complete search history.

(56) References Cited

U.S. PATENT DOCUMENTS

| | | | | |
|---|---|---|---|---|
| 2012/0150742 A1* | 6/2012 | Poon | ...................... | G06Q 20/20 705/44 |
| 2012/0215609 A1* | 8/2012 | Yoo | ........................ | G06Q 30/02 705/14.23 |
| 2014/0358777 A1* | 12/2014 | Gueh | ................. | G06Q 20/3223 705/43 |
| 2015/0324803 A1* | 11/2015 | Karamchedu | ........ | G06Q 20/425 705/39 |
| 2015/0339656 A1* | 11/2015 | Wilson | ............... | G06Q 20/3226 705/44 |

* cited by examiner

*Primary Examiner* — Allyson Trail
(74) *Attorney, Agent, or Firm* — Buckley, Maschoff & Talwalkar LLC

(57) ABSTRACT

A method and system include receiving, by a computer from an e-Commerce website, a payment authorization request that comprises payment data and a Mobile Station International Subscriber Directory Number (MSISDN) associated with a mobile device; verifying the MSISDN by comparing MSISDN to a subscriber database; generating a message to verify a payment transaction at the e-Commerce website, after the MSISDN is validated; receiving the verification message at the mobile device; verifying the payment transaction by transmitting a mobile personal identification number (PIN) associated with the MSISDN in response to the verification message; generating an authorization message indicating the payment transaction is one of approved or declined; and transmitting the authorization message to a merchant associated with the e-Commerce website. Numerous other aspects are provided.

19 Claims, 7 Drawing Sheets

METHOD TO ENABLE CONSUMERS TO MAKE PURCHASES AT E-COMMERCE WEBSITES USING THEIR MOBILE NUMBER

BACKGROUND

The use of credit card, debit cards, stored values cards, and other means of payment relying on payment account numbers (PANs) as opposed to cash is ever-increasing among consumers. Some consumers may perform transactions using a mobile account/wallet where their mobile number is linked with a payment account number. The mobile wallet consumers ("Mobile Consumers") may be restricted in their options to make purchases at traditional e-Commerce websites, which may only accept credit/debit/stored value card numbers as a payment credential, and not mobile phone numbers.

The present inventors have now realized that it may be desirable to provide additional opportunities for Mobile Consumers to make purchases at e-commerce websites using a mobile phone number as a payment credential.

DETAILED DESCRIPTION

Embodiments of the invention provide a method and system for Mobile consumers to pay at a traditional e-Commerce website with the Mobile consumer's mobile telephone number as a payment credential, where the mobile telephone number is linked to a payment account number (PAN) instead of using credit cards, debit cards, stored values cards, and other means of payment relying on payment account numbers (PANs).

Figure 1:
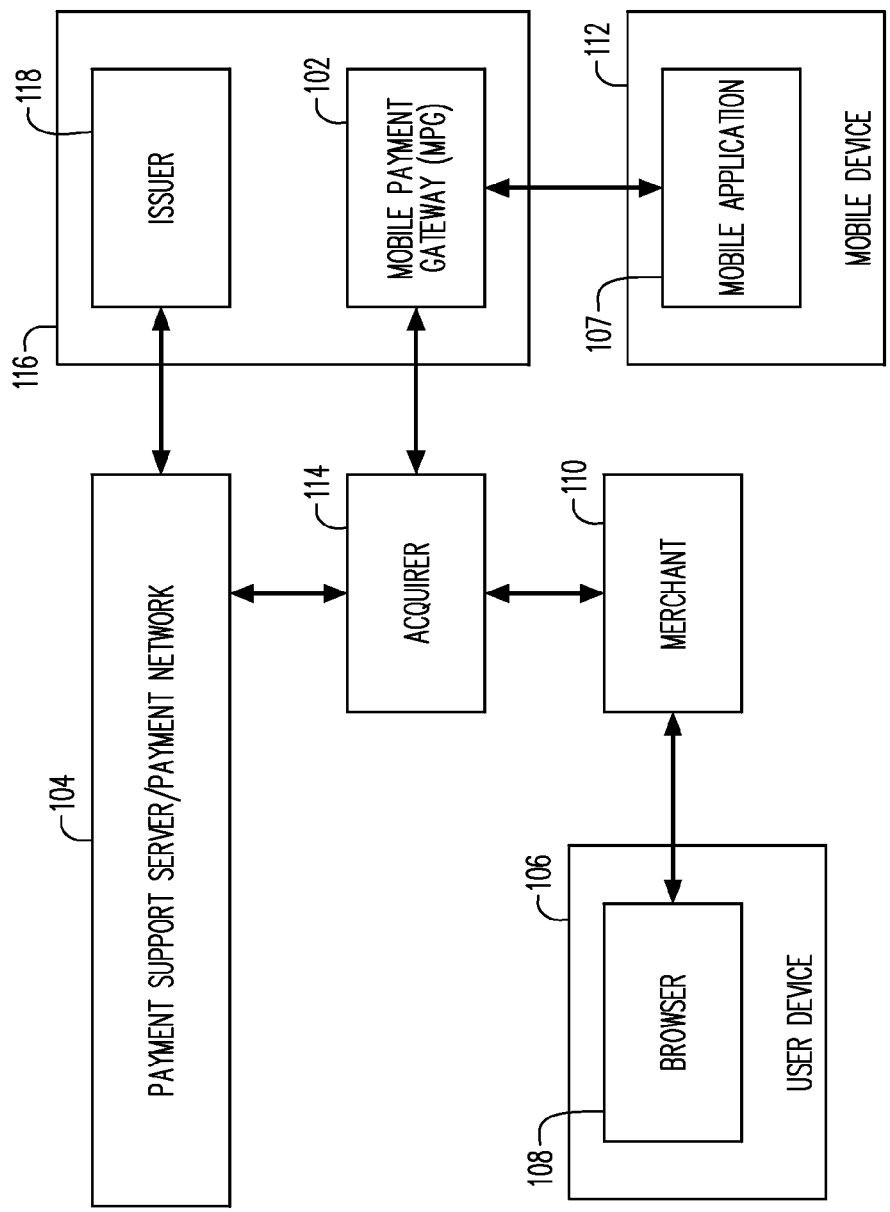
FIG. 1 is a schematic block diagram representation of a system, in accord with some aspects of some embodiments herein.

FIG. 1 is a block diagram that illustrates a payment system 100 provided in accordance with aspects of the present disclosure.

Each block shown in FIG. 1 may be taken to represent a party that participates in or facilitates a payment transaction and/or one or more computing devices operated by such party.

Block 102 in FIG. 1 represents a Mobile Payment Gateway (MPG) computer. The MPG computer 102 may provide mobile account transaction and translation services for Mobile to PAN mapping in accordance with aspects of the present disclosure. Features of the MPG computer ("MPG") 102 and/or functions performed by the MPG computer 102 will be described below in connection with FIGS. 2-6.

Block 104 in FIG. 1 represents a payment network as well as one or more payment support services computers operated in association with the payment network. These facilities may in some cases below be referred to either as "payment support services computer 104" and/or "payment network 104", since all of these facilities may, in some embodiments, be constituted by a single computer or a group of cooperating computer systems. Features of the payment support services computer 104 and/or functions performed by the payment support services computer 104 will be described below in connection with FIGS. 2-6.

The MPG computer 102 may also function as a "mobile telephone number (MSISDN) requestor" as described further below. In some embodiments, an issuer processor and/or computer 118 associated with an issuing financial institution 116 may supply the MPG computer 102 with mobile account data associated with consumers' accounts, as described below. In other embodiments, a payment support services computer 104 may act as the payment account requestor based on the MSISDN.

It should also be understood that, in many of its functions, the payment network 104 may duplicate or closely resemble the functionality of existing payment networks.

Block 106 in FIG. 1 represents a user device by which the user may access and interact with an e-commerce website. As will be appreciated from earlier discussion, the user device 106 may be, for example, a personal computer or a smartphone that runs a mobile browser, in one or more embodiments. In other possible embodiments, the user device 106 may be a tablet computer, a laptop computer, a game console or a smartwatch. One software feature of the user device 106 may be a browser program 108. The browser program 108 may handle internet-based interactions between the user device 106 and other devices. For present purposes, such other devices may include a merchant computer 110 associated with a merchant that operates an e-commerce website.

Block 112 in FIG. 1 represents a user mobile device, associated with a mobile account, as will be described further below. In one or more embodiments, the user or consumer may access and interact with the MPG computer 102, as well as an e-commerce website with the mobile device 112. The mobile device 112 may be, for example, a mobile phone or a smartphone that runs a mobile browser or application 107. In other possible embodiments, the mobile device 106 may be a tablet computer, a laptop computer, a game console or a smartwatch. One software feature of the mobile device 112 may be an application program 107. The application program 107 may handle internet-based interactions between the mobile device 112 and other devices and support receiving MPG initiated requests, for example, as described below. In one or more embodiments, as described further below, a request is made to the consumer to enter a mobile personal identification number (PIN) associated with the mobile PAN. The request and response to the request may be facilitated via the mobile application program 107 (e.g., MPG device application). As is well known in the art, and as used herein, an application ("apps") refers to a self-contained program or piece of software designed to fulfill a particular purpose.

The hardware and software features of a typical user device 106 and mobile device 112 are familiar to those who are skilled in the art, and need not be described or illustrated in detail. It is sufficient to note that the user device 106 and mobile device 112 most likely includes a processor (not separately shown) of some type, programmed and controlled by software instructions stored in one or more memory devices (not separately shown), which are also part of the user device 106 and mobile device 112.

An acquirer processor 114 operated by an acquirer (acquiring financial institution) is also shown as part of the system 100 in FIG. 1. As used herein, the acquirer processor may be referred to as "acquirer." The acquirer processor 114 may operate in a conventional manner to receive an authorization request for a payment account transaction from the merchant 110 via a computer or processing device associated with the merchant 110. The acquirer processor 114 may request the PAN from the MPG 102 based on the mobile number. Once the acquirer processor 114 receives the PAN from the MPG 102, the acquirer processor 114 may route the authorization request via the payment network 104 to an issuer domain 116, for authorization. In some embodiments, the acquirer processor 114 may route the authorization request to an issuer domain 116, for example. In one or more embodiments, the issuer 116 may include a server computer and/or processor 118 operated by the issuer of a mobile payment account that the user has elected to employ for the payment account transaction and the MPG 102. As will be seen from subsequent discussion, a verification/security function may also be carried out by the payment support services computer 104 and MPG 102 in association with the routing performed by the payment network 104. The authorization response generated by the issuer processor 118 may be routed back to the merchant 110 via the payment network 104 and the acquirer processor 114.

The issuer processor 118 may be operated by or on behalf of a financial institution or Issuing Bank ("Issuer") that partners with a Mobile Network Operator which issues the mobile payment accounts to individual users. For example, the issuer processor 118 may perform such functions as (a) receiving and responding to requests for authorization of payment account transactions to be charged to mobile payment accounts issued by the Issuer; and (b) tracking and storing transactions and maintaining account records. One function worth noting at this point is that the Issuer may be a source of payment credential data for the MPG computer 102 in connection with subscribers to the MPG and related to one or more of their payment accounts. Thus the Issuer may facilitate so-called digitization of users' payment accounts into user account partitions maintained by the MPG computer 102.

The components of the system 100 as depicted in FIG. 1 are only those that are needed for processing a single transaction. A typical payment system may process many purchase transactions (including simultaneous transactions) and may include a considerable number of payment account issuers and their computers/processors, a considerable number of acquirers and their computers/processors, and numerous merchants and their computer systems. The system 100 may also include a very large number of payment account holders/users (consumers), who may use their mobile payment accounts for online shopping transactions.

Figure 2A:
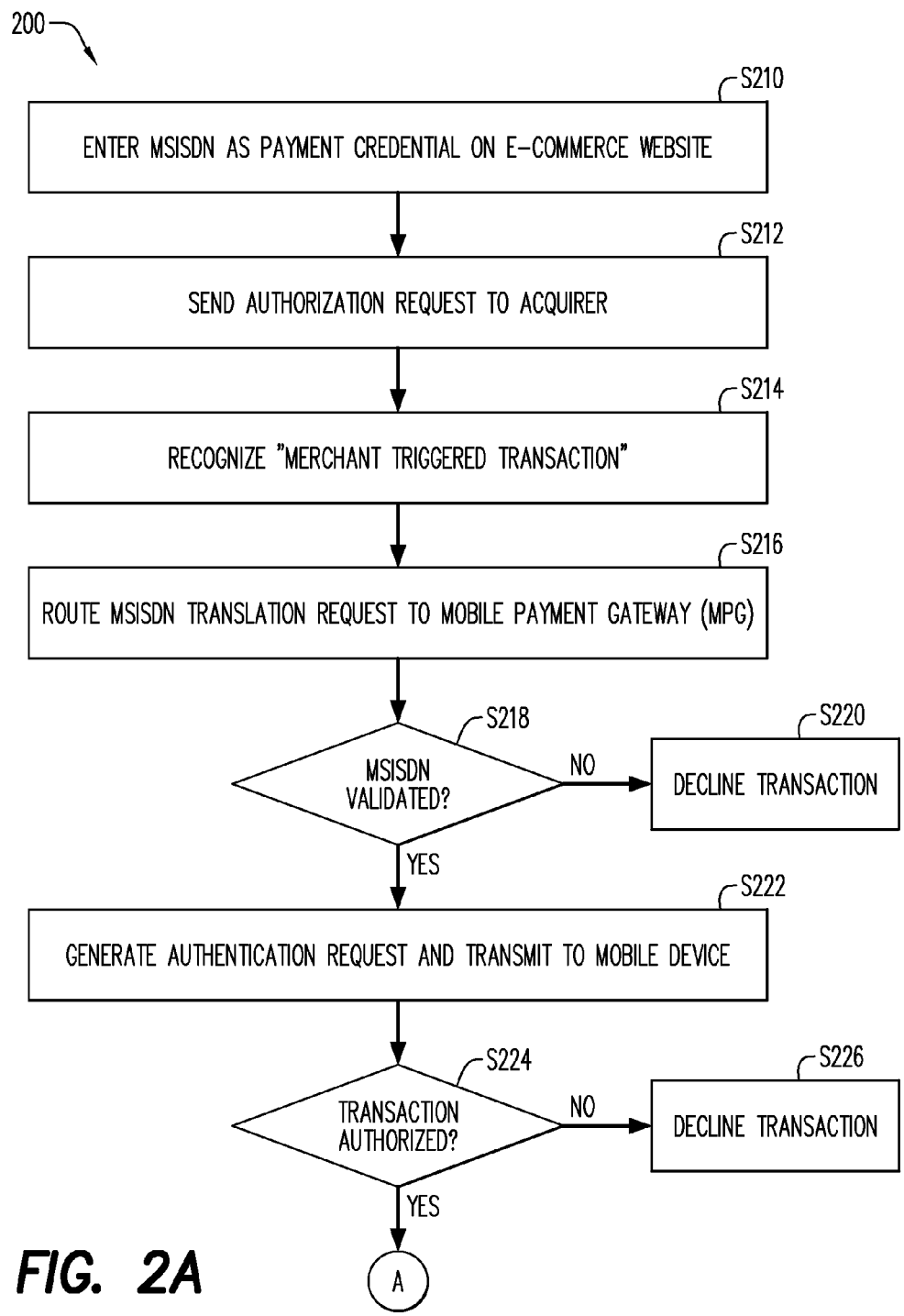
FIGS. 2A and 2B are a flow diagram illustrating a process that may be performed in accordance with aspects of some embodiments herein.
Figure 2B:
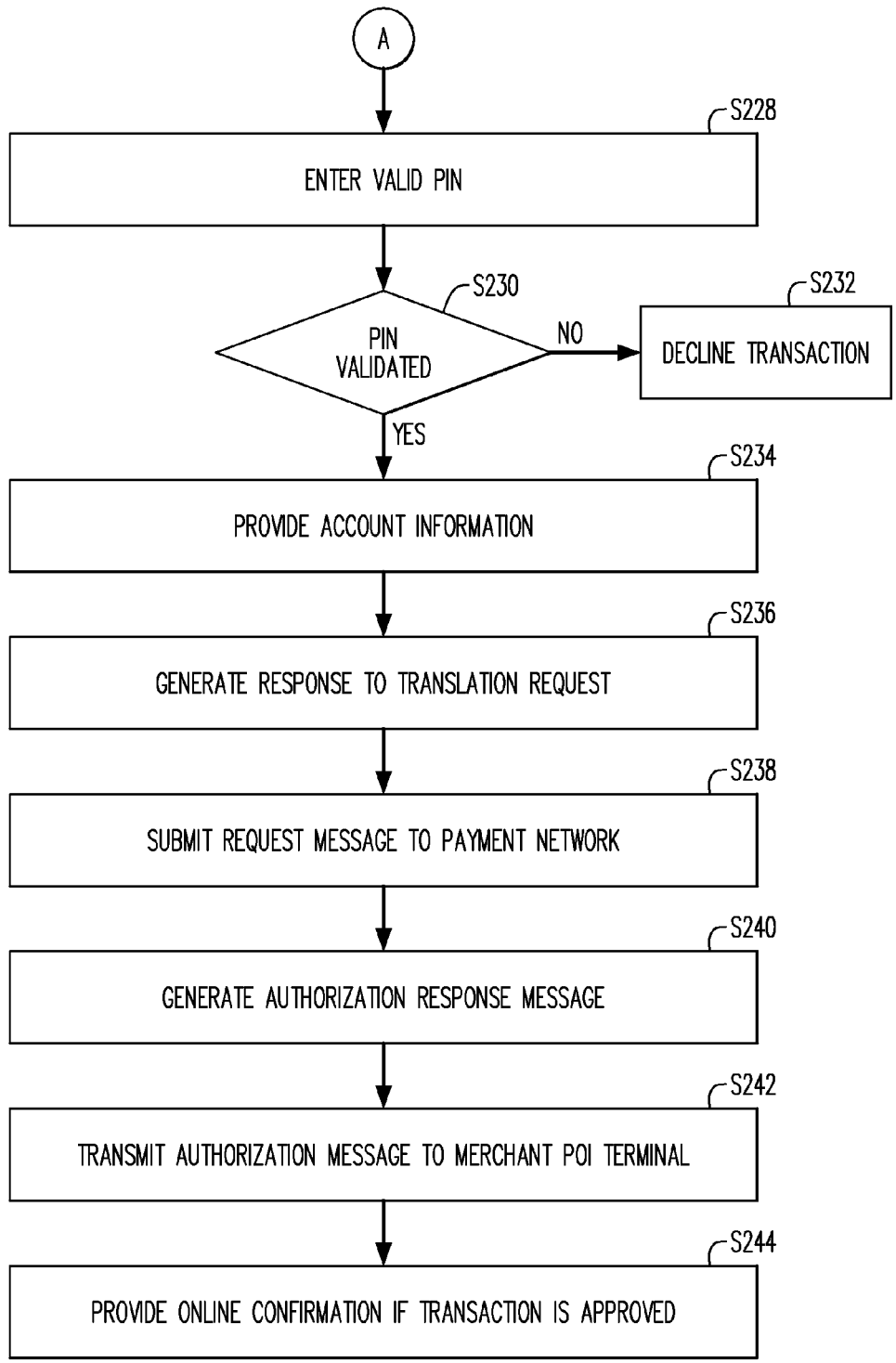
Figure 3:
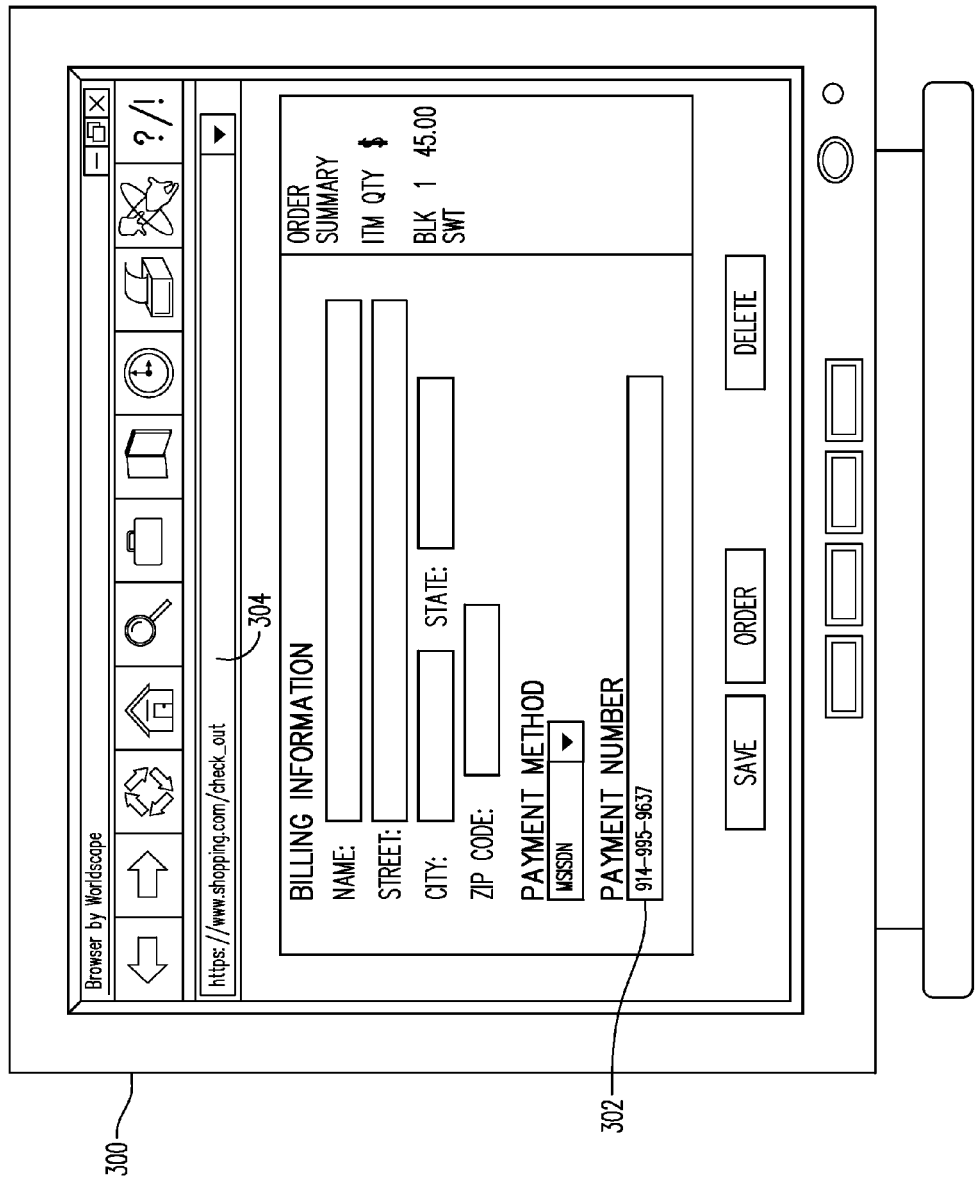
FIG. 3 is an outward view of a graphical interface in accordance with some aspects of some embodiments herein.
Figure 4:
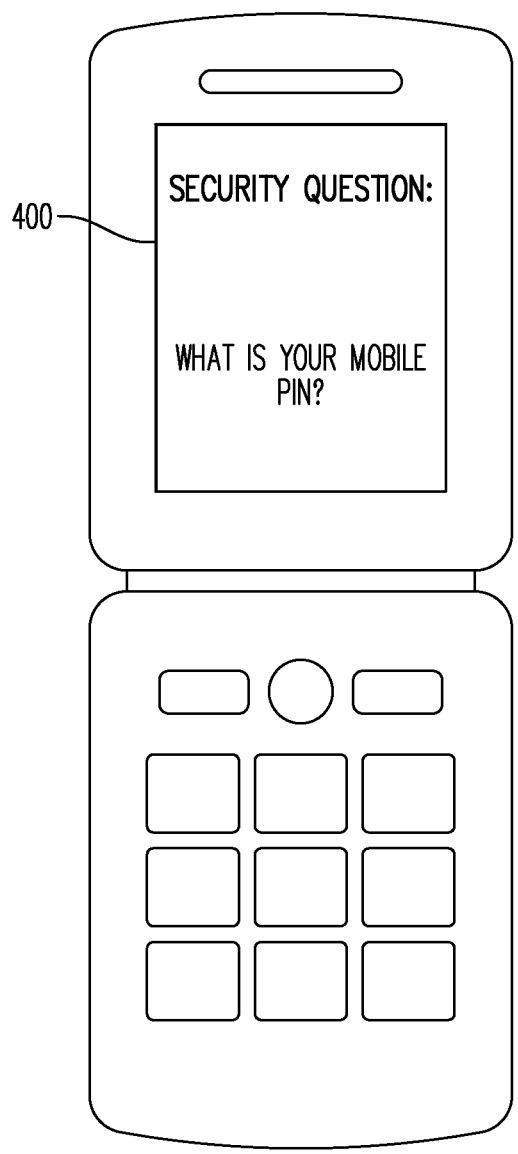
FIG. 4 is an outward view of a graphical interface in accordance with some aspects of some embodiments herein.

FIGS. 2A-2B illustrate a method 200 that might be performed by some or all of the elements of the system 100 described with respect to FIG. 1 according to some embodiments of the present invention. The flow chart(s) described herein do not imply a fixed order to the steps, and embodiments of the present invention may be practiced in any order that is practicable. Note that any of the methods described herein may be performed using any suitable combination of hardware (e.g., circuit(s)), software or manual mean. For example, a non-transitory computer-readable storage medium (e.g., a fixed disk, a floppy disk, a CD, a DVD, a Flash drive, or a magnetic tape) may store thereon instructions that when executed by a machine result in performance according to any of the embodiments described herein. In one or more embodiments, the system 100 is conditioned to perform the process 200, such that the system 100 is a special purpose element configured to perform operations not performable by a general purpose computer or device.

In one or more embodiments, prior to beginning process 200, a consumer pre-registers a mobile number (MSISDN) associated with a mobile device with the issuer processor 118. In one or more embodiments, the MSISDN is associated with a payment account (e.g., a prepaid stored value account, a debit/credit account, etc.). A consumer's mobile phone number, also referred to as a Mobile Station International Subscriber Directory Number ("MSISDN"), may be associated with a "virtual payment account number" (virtual PAN) or pseudo-PAN. In one or more embodiments, the virtual PAN (MSISDN) may be linked to a real PAN of a prepaid, credit or debit card. In one or more embodiments, the mobile phone number then may become a proxy for the virtual PAN and the handset may become an authentication device. As a result, in one or more embodiments the transaction(s) are consumer-initiated and 100% authenticated by the Issuer.

Initially at S210, a consumer enters an MSISDN (pseudo-PAN) as a payment credential in a pre-designated section 302 (FIG. 3) on user interface 300 of an e-Commerce website 304 associated with the merchant 110. In one or more embodiments, the e-Commerce website 304 may have a function that may allow entry of an MSISDN as a payment credential. Then at S212, the merchant 110 sends an authorization request to the acquirer processor 114, including the MSISDN (pseudo-PAN). In one or more embodiments, the transaction format of the point-of-interaction (POI) terminal associated with the merchant (e.g., merchant computer) may support MSISDN (pseudo-PAN) format. Then in S214, the acquirer processor 114 receives the authorization request and determines the transaction associated with the request is "merchant triggered." In one or more embodiments, a "merchant triggered" transaction indicates the merchant is making a provision to accept a mobile number as the payment credential instead of the typical 16 digit PAN listed on credit, debit and prepaid cards. The acquirer processor 114 then routes a PAN translation request to the MPG 102 with the MSISDN (pseudo-PAN) in S216. In one or more embodiments, the PAN translation request may be a request to map the MSISDN to a PAN. In one or more embodiments, the acquirer processor 114 and MPG 102 are integrated so that the acquirer processor 114 may request the PAN associated with the PAN stored in the MPG 102. Once the PAN is received by the acquirer processor 114, the acquirer processor 114 may submit an authorization request to the issuer processor 118.

Then in S218 the MPG 102 determines whether the MSISDN is valid. In one or more embodiments, to validate the MSISDN the MPG 102 performs a look-up of the MSISDN on the Issuer's MPG registered subscriber database (e.g., table 600 in FIG. 6). As described above, prior to performing process 200, the consumer or subscriber registers their MSISDN and other profile information with the issuer 116 via the issuer processor 118. If in S218 the MPG 102 determines the MSISDN entered by the consumer at S210 does not match an MSISDN in the registered subscriber database 600, the process 200 proceeds to S220 and the transaction authorization request is denied. If in S218 the MPG 102 determines the MSISDN entered by the consumer at S210 does match an MSISDN registered consumer profile, the process 200 proceeds to S222.

In S222 the MPG 102 generates an authentication request 400 (FIG. 4) and transmits the request message to the mobile device 112 based on the registered subscriber/consumer profile matching MSISDN (pseudo-PAN). In one or more embodiments, the authentication request 400 may authenticate the consumer and request the PIN. In one or more embodiments, the PIN is only known by the Consumer who owns the mobile wallet account, as described further below. In one or more embodiments, the mobile device 112 includes a compatible MPG device application to support receiving the MPG initiated authentication request 400. As is well known in the art, and as used herein, an application ("apps") refers to a self-contained program or piece of software designed to fulfill a particular purpose.

After receiving the authentication request 400 (FIG. 4), the consumer determines whether the transaction should be authorized in S224. If the consumer does not authorize the transaction in S224, the process 200 proceeds to S226 and the transaction is declined. If the consumer does authorize the transaction in S224, the process 200 proceeds to S228 and the consumer enters a personal identification number ("PIN") associated with the mobile payment account and the PIN is transmitted to the MPG 102. In one or more embodiments, the mobile PIN may not be stored on the mobile device 112 and may require positive manual keypad entry by the consumer. In one or more embodiments, the advantage of the consumer entering the PIN on their mobile device is that these payment credentials may not be shared with the merchant, thereby making a more secure transaction for the consumer. In one more embodiments, the mobile PIN may be encrypted for transmission via known standard MPG encryption schemes. In S230 the PIN is validated. In one or more embodiments, the MPG 102 decrypts the consumer's mobile PIN and determines whether the PIN is valid by comparing the user entered PIN to the PIN in the registered subscriber profile database, (e.g., 606 in FIG. 6). If the user entered PIN is not the same as the PIN in the registered subscriber profile database, the process 200 proceeds to S232, and the transaction is declined. If the user entered PIN is the same as the PIN in the registered subscriber profile database, the process proceeds to S234, and the MPG 102, acting as an Issuer agent in some embodiments, provides the account information for the merchant purchase authorization request. In one or more embodiments, the account information may include card account PAN and card verification code (CVC2). Then in S236 the MPG 102 responds to the Acquirer PAN mapping/translation Request Message by providing the acquirer processor 114 with the PAN. In one or more embodiments, the response may include the card account PAN and the CVC2. In one or more embodiments, if the mobile PIN is not validated or if the consumer elects to decline, the MPG 102 generates a decline response to the PAN translation request associated with S216. In one or more embodiments, the acquirer processor 114 is able to receive a PAN mapping request.

Then in S238, the acquirer processor 114 submits the Request Message including the card PAN, CVC2, and other suitable data elements to the payment network 104. In one or more embodiments, the payment network 104 routes the request message to the issuer 116, and the issuer processor 118 responds by generating an Authorization Response Message in S240. In one or more embodiments, the Authorization Response Message may approve or decline the transaction based on standard business logic. In one or more embodiments, response messages from the acquirer processor 114 to the merchant 110 may be limited to approved or decline.

Turning to S242, an Authorization Message is transmitted to the point-of-interaction (POI) terminal associated with the merchant 110 (e.g., merchant computer). If the Authorization Response Message from the issuer processor 118 is positive, the acquirer processor 114 sends an approved authorization message to the merchant POI terminal with the appropriate data suitable elements. If the Authorization Response Message from the issuer processor 118 is negative, or if a decline is received from the MPG 102 in S232, the acquirer processor 114 sends a decline authorization message to the merchant POI terminal.

Then, if the transaction is approved, the merchant 110 may provide an online confirmation to the consumer displayed on the website 304, including truncated card account PAN in S244.

Figure 5:
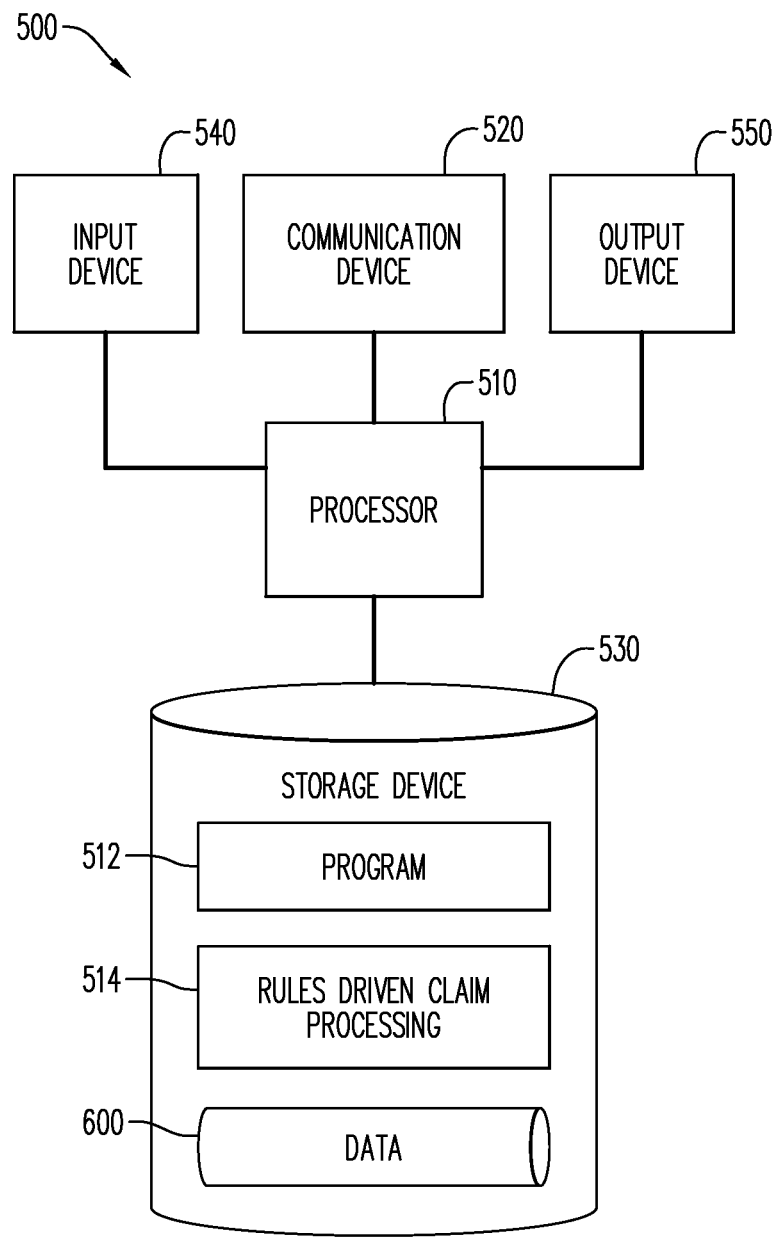
FIG. 5 is a block diagram of a system, in accordance with some aspects of some embodiments herein embodiments.

Note that the embodiments described herein may be implemented using any number of different hardware configurations. For example, FIG. 5 illustrates a Payment Credential Platform 500 that may be, for example, associated with the system 100 of FIG. 1. The Payment Credential Platform 500 comprises a MSISDN payment credential processor 510, such as one or more commercially available Central Processing Units (CPUs) in the form of one-chip microprocessors, coupled to a communication device 520 configured to communicate via a communication network (not shown in FIG. 5). The communication device 520 may be used to communicate, for example, with one or more users or computers. The Payment Credential Platform 500 further includes an input device 540 (e.g., a computer mouse and/or keyboard to enter information about transactions) and an output device 550 (e.g., a computer monitor or printer to output a transaction information report and/or evaluation).

The processor 510 also communicates with a storage device/memory 530. The storage device 530 may comprise any appropriate information storage device, including combinations of magnetic storage devices (e.g., a hard disk drive), optical storage devices, mobile telephones, and/or semiconductor memory devices. The storage device 530 stores a program 512 and/or payment credential platform logic 514 for controlling the processor 510. The processor 510 performs instructions of the programs 512,514, and thereby operates in accordance with any of the embodiments described herein. For example, the processor 510 may receive a MSISDN which may then be analyzed by the processor 510 to automatically determine whether to allow the transaction.

The programs 512,514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" or "retrieved" by or "transmitted" to, for example: (i) the Payment Credential Platform 500 from another device; or (ii) a software application or module within the Payment Credential Platform 500 from another software application, module, or any other source.

In some embodiments (such as shown in FIG. 5), the storage device 530 further stores a consumer profile database 600. Some examples of databases that may be used in connection with the Payment Credential Platform 500 will now be described in detail with respect to FIG. 6. Note that the database described herein is only an example, and additional and/or different information may actually be stored therein. Moreover, various databases might be split or combined in accordance with any of the embodiments described herein.

Figure 6:
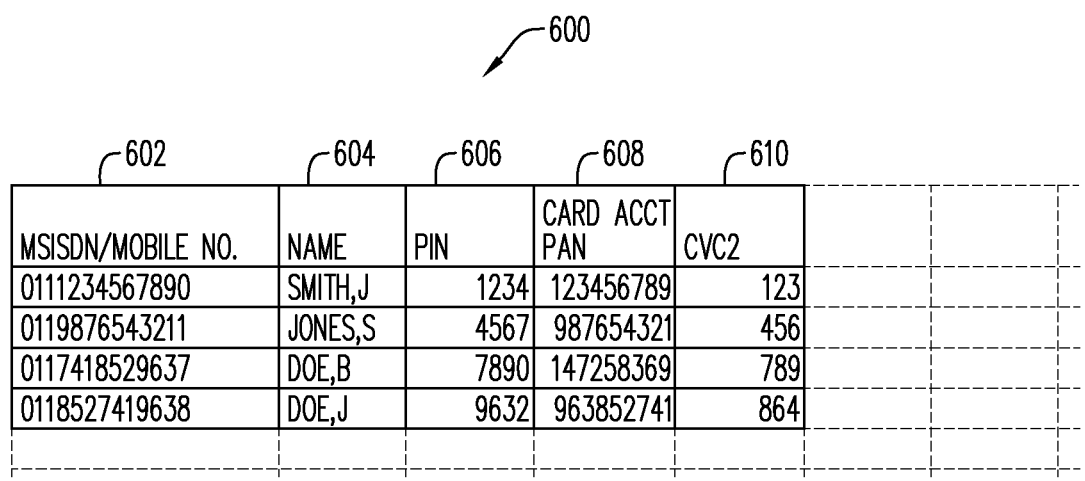
FIG. 6 is a table in accordance with some aspects of some embodiments herein.

Referring to the consumer profile database in FIG. 6, a table 600 is shown that represents the consumer profile database 600 that may be stored in memory 530 (Payment Credential Platform 500) according to some embodiments. The table 600 may include, for example, entries identifying profile information associated with a consumer or subscriber. The table 600 may define fields 602, 604, 606, 608 and 610 for each of the entries. The fields 602, 604, 606, 608 and 610, may, according to some embodiments, specify: an MSISDN/Mobile No. 602, a Name 604, a PIN 606, a Card Account PAN 608, and CVC2 610. Other suitable fields may be used in addition to, or instead of, the fields listed herein. The consumer profile database 600 may be created and updated, for example, based on information electrically received on a periodic basis.

The MSISDN/Mobile No. 602, may be, for example, a number uniquely identifying a subscription in a mobile network (e.g., a telephone number). The name 604 may be the name of the consumer or subscriber associated with the MSISDN. The PIN 606 may be a unique alphanumeric code associated with the account. The Card Account PAN 608 may be a unique alphanumeric code identifying a payment account. The CVC2 610 may be a unique alphanumeric code associated with the mobile number 602. In one or more embodiments, the information in at least one of the fields specified by 602, 604, 606, 608 and 610 may be used to determine an identity of a consumer and authorize a transaction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a MSISDN payment credential module. The method steps can then be carried out using the distinct software modules and/or sub-modules of the system, as described above, executing on one or more hardware processors 510 (FIG. 5). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
    receiving, by a computer from an e-Commerce website, a payment authorization request that comprises payment data and a Mobile Station International Subscriber Directory Number (MSISDN) associated with a mobile device;
    verifying the MSISDN is valid by comparing MSISDN to a subscriber database;
    generating a message to verify a payment transaction at the e-Commerce website, after the MSISDN is validated;
    receiving the verification message at the mobile device;
    verifying the payment transaction by transmitting a mobile personal identification number (PIN) associated with the MSISDN in response to the verification message;
    generating an authorization message indicating the payment transaction is one of approved or declined; and
    transmitting the authorization message to a merchant associated with the e-Commerce website.

2. The method of claim 1, wherein the MSISDN is a payment credential.

3. The method of claim 1, further comprising:
    registering the MSISDN with an issuer prior to receiving the MSISDN in the computer.

4. The method of claim 1, wherein the payment authorization request is received by an acquirer.

5. The method of claim 4, further comprising:
    transmitting the MSISDN from the acquirer to a Mobile Payment Gateway (MPG).

6. The method of claim 5, wherein verifying the MSISDN by comparing MSISDN to a subscriber database further comprises:

the Mobile Payment Gateway determining the MSISDN matches a registered subscriber profile on the subscriber database.

7. The method of claim 1, wherein the payment authorization request is a merchant initiated transaction.

8. The method of claim 1, wherein the mobile PIN is not stored on the mobile device.

9. The method of claim 1, wherein transmitting a mobile personal identification number (PIN) associated with the MSISDN in response to the verification message further comprises:
entering the mobile PIN by manually selecting the mobile PIN via a keypad.

10. The method of claim 1 further comprising:
decrypting the mobile PIN; and
validating the decrypted mobile PIN against a registered mobile PIN associated with the MSISDN in the subscriber database.

11. The method of claim 10, further comprising:
generating a validation response message; and
transmitting the validation response message to an acquirer.

12. The method of claim 11, wherein generating the validation response message further comprises one of:
generating an accept response for the purchase authorization request including card account payment account number and card verification code, after the mobile PIN is validated; and
generating a deny response for the purchase authorization request, after validation of the mobile PIN fails.

13. The method of claim 11, further comprising:
receiving at an issuer the validation response message from the acquirer; and
one of approving or denying the purchase transaction.

14. The method of claim 13, wherein the generated authorization message indicating the payment transaction is one of approved or denied is transmitted from the issuer to the acquirer.

15. The method of claim 14, wherein the acquirer transmits the authorization message to the merchant associated with the e-Commerce website.

16. A system comprising:
a Mobile Station International Subscriber Directory Number (MSISDN) payment credential processor; and
a memory in communication with the MSISDN payment credential processor and storing program instructions, the MSISDN payment credential processor operative with the program instructions to perform functions as follows:
receiving, from an e-Commerce website, a payment authorization request that comprises payment data and a MSISDN associated with a mobile device;
analyzing the MSISDN associated with the mobile device to verify a validity of the MSISDN;
transmitting a message to verify a payment transaction at the e-Commerce website to the mobile device;
receiving a mobile personal identification number (PIN) associated with the MSISDN via entry in the mobile device in response to the verification message to verify the payment transaction; and
transmitting a generated authorization message indicating the payment transaction is one of approved or declined to a merchant associated with the e-Commerce website after the mobile PIN is analyzed for validity.

17. The system of claim 16, wherein the e-commerce website is associated with the merchant, and the merchant e-Commerce website initiates the payment authorization request.

18. The system of claim 16, wherein:
the MSISDN is registered with an issuer prior to receiving the payment authorization request from the e-Commerce website.

19. The system of claim 16, wherein the MSISDN is a payment credential.

* * * * *